United States Patent [19]

Kottke

[11] 4,381,813

[45] May 3, 1983

[54] METHOD FOR MANUFACTURING FOUNDRY CORES

[75] Inventor: Roger H. Kottke, Crystal Lake, Ill.

[73] Assignee: The Quaker Oats Company, Chicago, Ill.

[21] Appl. No.: 300,937

[22] Filed: Sep. 10, 1981

[51] Int. Cl.$^3$ ............................................. B28B 7/34
[52] U.S. Cl. ................................. 164/527; 106/38.2; 164/526; 523/144; 523/146
[58] Field of Search ............... 106/38.2; 260/39 SB, 260/998.18; 164/526, 527, 21; 523/139, 144, 146

[56] References Cited

U.S. PATENT DOCUMENTS

| | | | |
|---|---|---|---|
| 4,073,761 | 2/1978 | Bowman et al. | 164/21 |
| 4,304,286 | 12/1981 | Waldron | 164/526 |
| 4,312,671 | 1/1982 | Williame | 106/38.2 |
| 4,317,763 | 3/1982 | Menting | 523/144 |

*Primary Examiner*—Lorenzo B. Hayes
*Attorney, Agent, or Firm*—Neuman, Williams, Anderson & Olson

[57] ABSTRACT

In-situ formation of metal sulfonate curing agents for foundry sand binders.

4 Claims, No Drawings

METHOD FOR MANUFACTURING FOUNDRY CORES

The present invention relates to chemical compositions and methods useful in metal founding, and more particularly, to catalysts which are useful in curing so-called "hot-box" resin-type binders for core sand and the like used in metal foundries.

The expression "core sand" is used herein to include sand used in making shaped of all sorts for foundry purposes, including sand shapes which are to be used as molds or cores, sand shapes useful in other casting processes, including sand shapes which are made in patterns and cured therein as well as free standing sand shapes which may be cured in conventional ovens or in microwave ovens for any desirable purpose in foundry work.

In typical foundry practice, core sands of various kinds are formed into sand shapes and set by various methods. Generally speaking, binders for core sand may be subdivided into the so-called "hot box" type of binder and the so-called "no-bake" type of binder. The hot box type binders are generally preferred for certain applications because they are usually inexpensive, because they produce generally satisfactory results, and because they are well suited to high volume production, particularly production of ordinary iron castings. A typical hot box binder utilizes furan based resins, phenolformaldehyde resins, often mixed or modified with ureaformaldehyde binders. While cast iron is tolerant of gaseous nitrogen released when the hot metal is poured over a core containing a urea-formaldehyde-containing (UF) binder, certain other metals and alloys are not desirably used with binders of this sort. Accordingly, the low cost potential of phenol-formaldehyde binders modified with UF resins cannot be realized in many applications.

Referring now to certain hot box type binders, while these binders are desirable in many respects, there are recognized drawbacks with these binder systems, and their catalysts, particularly catalyzed binders of the furan type. By "furan type" or "furan-based" binders as used herein is meant those binders which contain derivatives of furan, particularly including furfuryl alcohol, wheather used alone or with phenolic resins, urea-formaldehyde resins, or mixtures thereof.

In present foundry practice, it is customary to form a core for a casting by filling a heated pattern cavity with a core forming material which comprises core sand mixed with a binder and a catalyst. Desirably, when the core sand material is mixed and placed in the mold, the high temperatures cause rapid curing of the binder, which binds the core sand, making a core which is capable of easy removal from the pattern, which has high strength so as to withstand rough handling, and which is stable so as to permit storage over a long period of time. Moreover, an ideal binder is one which permits the sand to retain so-called high flowability or ease of pattern filling when the sand and the binder are mixed.

In a desirable catalyst and binder system, the binder will not set prematurely, even in the presence of a catalyst, at a given working temperature, but the binder will cure rapidly and completely when a desired threshhold temperature is reached or exceeded.

While prior art catalyst and binder systems have functioned satisfactorily in many respects, as the cost of labor and the cost of maintaining production facilities have increased, it has become economically important to mix core sand with binders in larger quantities to increase production and reduce costs. In this respect, prior art curing systems providing relatively short bench lives have either required repetitious work efforts on behalf of the foundry workers mixing the material, or have resulted in waste of chemicals resulting from the need to discard material which was setting up prematurely, i.e., before it could be placed in molds or patterns in which the sand core elements are formed. By "bench life", it is meant the time during which the catalyst may remain mixed with the binder before a substantial portion of the polymerization reaction begins to take place.

To illustrate prior art practices, even though known core binder adhesive systems using known catalysts will commonly have bench lives of from one to four hours, it is preferable that such binders have bench lives equal to at least the length of one working shift, and preferably an hour or more longer than that, i.e., bench lives of eight to twelve or even twenty-four hours.

Accordingly, an ideal catalyst, even though having a protracted bench life, would have a relatively rapid setting time, and would promote thorough curing of the binder throughout the entire sand mix.

Still further, a desirable binder and catalyst system should preferably create low gas evolution when subject to heat, and should impart high tensile strength to the finished core or other sand product made therefrom and used in molding processes.

Metal sulfonate salts have been found useful in curing binder systems, including furan type binder systems. However, the metal sulfonate curing agents or catalysts, such as aluminum, copper, zinc, ferric or ammonium salts of a benzene-, toluene-, phenol-, methane- or xylene-sulfonic acid, while functionally desirable and advantageous, suffer certain disadvantages in handling and storage. For example, such metal sulfonate salts are generally prepared by chemical reaction in a separate operation, isolated from the reaction mixture and stored until ready for use in a foundry. Then, when ready for use, the salt is dissolved in water to form a solution which can be metered onto the core sand. Because of the solubility characteristics of the metal sulfonate salts in water, special precautions must be taken in storing solutions of the salts, particularly when the solutions are to be stored under relatively low temperature conditions such as are encountered in a cold warehouse or foundry during winter. An expedient which has been used in attempting to overcome the solubility problems at low temperatures is to use methanol as the solvent in full or partial replacement of water. This expedient, of course, involves additional efforts and expenses.

A principal object of this invention is to provide latent catalyst systems which are economical and storage stable.

Another object of the invention is to provide methods of curing resin systems and of making sand cores for use in foundry applications.

According to this invention, it has now been found that metal sulfonate salts useful as catalysts or curing agents for core sand binders can be formed in-situ in the foundry in conjunction with the production of core sand materials. By virtue of this discovery, it is not necessary to prepare a metal sulfonate catalyst in a separate operation and thereafter use particular solvents or take any special precautions with respect to storage of the catalysts.

According to this invention, a metal sulfonate catalyst for foundry core sand binders is formed in-situ by mixing with core sand a sulfonic acid and a compound reactable at ambient temperatures with the sulfonic acid containing an appropriate metal cation to form a metal sulfonate. Reaction between the sulfonic acid and the reactable metal-containing compound takes place to form a metal sulfonate salt which serves as an effective catalyst or curing agent for the sand binder. Then the foundry core sand binder is mixed with the sand. When the so-treated sand mixture is heated to the temperature at which the core is formed in the mold or pattern, the binder is cured rapidly to produce a strong rigid mold, core or other sand article. Inasmuch as the metal sulfonate catalysts are formed at lower, ambient temperatures and bring about cure only at the high temperatures conventionally employed in hot box binder systems, such as temperatures above 300° F. and usually on the order of 400-425° F., the catalyst system disclosed herein can be called "a latent catalyst system".

To form the binder curing agents in accordance with this invention, an aqueous solution of an aromatic or aliphatic sulfonic acid is mixed with and distributed on the core sand. Examples of such sulfonic acids are benzenesulfonic acid, toluenesulfonic acid, phenolsulfonic acid, methanesulfonic acid, xylenesulfonic acid, dodecylbenzenesulfonic acid, cumenesulfonic acid, tertiary butylbenzenesulfonic acid, diisopropylbenzenesulfonic acid, mesitylenesulfonic acid, methanesulfonic acid, octane-1-sulfonic acid and octane-2-sulfonic acid. Also mixed with and distributed on the core sand is a compound reactable with the sulfonic acid and containing a metal cation. The metal cation can be any metal which forms a metal sulfonate, such as sodium, potassium, calcium, barium, nickel, aluminum, copper, zinc, ferric iron or ammonium (ammonium being considered herein as equivalent to metal). Such reactable metal compounds are generally weak bases which will react readily with the sulfonic acid. Most preferably, the reactable metal compound is a metal carbonate which in reaction with the sulfonic acid liberates carbon dioxide. Then there is applied to the core sand a binder which is capable of being cured or set by means of a metal sulfonate catalyst. Such binders include, for example, phenol-aldehyde resins, urea-aldehyde resins, furan resins, e.g. furfuryl alcohol-formaldehyde resins, furfuryl alcohol-resorcinol resins, furfuryl alcohol-melamine resins, furfuryl alcohol polymers, polymers of furfuraldehyde and the like.

The metal sulfonate catalysts are generally used in amounts from about 5 to 40% by weight of the binder and in practice in the art the core sand binders are generally employed in amounts of from 0.5 to 5% by weight of the sand. Thus, the reactants which are used to form in-situ the curing agents or catalysts of this invention are applied to the sand in proper molar ratios, preferably a 1:1 molar equivalent ratio, to provide a metal sulfonate catalyst reaction product in an amount corresponding to about 5 to 40% by weight of the binder. In keeping with conventional practice, adhesion promoters such as ureido silane compounds can be advantageously used with the binders applied to the core sand.

The metal sulfonate catalysts are formed in-situ on sands of various types conventionally used in making foundry articles, with neutral or acidic sands generally being preferred, although basic sands such as olivine sands can be utilized if precautions are taken to avoid reaction of the sand with the sulfonic acid. Thus, for example, the core sand can be pure quartz sand (~99% silica), lake sand (~95% silica), chromite sand, zircon sand, sea sand and so forth.

The advantages of the invention will be apparent from the following examples.

EXAMPLE I

To 4000 grams of beneficiated lake sand in a Hobart laboratory mixer were added and mixed for 2 minutes 18 grams of a cupric toluenesulfonate solution (referred to herein as "premade catalyst") having the following composition:

| | |
|---|---|
| Copper toluenesulfonate | 36.0% |
| Toluenesulfonic acid | 5.0 |
| Methanol | 42.4 |
| Water | 15.0 |
| Other | 1.6 |

Then 60 grams of a binder were added and mixing continued for another 2 minutes; the binder having the following composition:

| | |
|---|---|
| Furfuryl alcohol | 67.0% |
| Urea resin (Beetle 65, American Cyanamid) | 14.0 |
| Phenolic resin (Phenco 1617, Plastics Engineering Co.) | 14.0 |
| Polyvinyl acetate resin (Gelva V 1.5, Monsanto Chemical Co,) | 5.0 |

EXAMPLE II

To 4000 grams of beneficiated lake sand in a Hobart laboratory mixer were added and mixed for 2 minutes 3.2 grams of solid copper carbonate. Then 15.7 grams of a 65% aqueous solution of phenolsulfonic acid were added and mixing continued for another 2 minutes. Finally, 60 grams of the binder of Example I were added and mixed for an additional 2 minutes.

EXAMPLE III

The procedure of Example II was repeated except that an equal weight of toluenesulfonic acid solution replaced the phenolsulfonic acid.

EXAMPLE IV

The sand mixes prepared in Examples I, II and III were blown into a Redford laboratory hot box machine and the patterns heated to 450° F. Dwell times of 20 and 30 seconds were used. The strength which the sand product possesses is determined by making a so-called "biscuit" or briquette of sand, that is, a formation of sand shaped in a characteristic way (a "dog bone" shape) and bonded by the resin being tested. After the so-called biscuit is formed, it is placed in a machine adapted to determine what the tensile and ultimate yield strengths of the part thus formed are. The shape of a typical briquette or biscuit is well known to those skilled in the art and accordingly, the characteristics thereof are not discussed further herein; for example, however, reference is made to such typical biscuit in a book entitled *Steel Foundry Practice,* by J. H. Hall, (Penton Publishing Co., Cleveland, Ohio, 1950) where such unit is shown and described on page 8. The sand specimens were broken and the tensile strength averaged for the two dwell times. The tensile strength results after various periods are shown in the table below:

| Sand | Broken immediately while | After 30 | Stored overnight at | Stored Overnight in saturated humidity |
|---|---|---|---|---|
| Specimen | still hot | Minutes | 30% RH | cabinet |
| Example I | 81 psi | 580 psi | 560 psi | 215 psi |
| Example II | 114 psi | 584 psi | 589 psi | 181 psi |
| Example III | 90 psi | 574 psi | 590 psi | 246 psi |

The above results show that the catalysts of Examples II and III formed in-situ exhibited tensile strengths comparable to the premade solution grade catalyst of Example I. The sand specimens of Examples I and III had bench lives of about 24 hours and the sand specimen of Example II had a bench life of about 3 hours.

EXAMPLE V

In this example dry copper carbonate was added to Wedron 5025 silica sand followed by a sulfonic acid and finally a resin binder. The mixes were blown into a hot box machine and patterns heated to 450° F. Dwell times of 20 and 30 seconds were used. The binder of Example I was employed. A ureido-silane adhesion promoter was employed in the binder in an amount of 0.3% by weight. The tensile strengths of the "dog bone" biscuits were determined while the biscuits were hot and after 30 minutes as well as after storage overnight at ambient temperatures and humidity (70–72° F. and 58–64% relative humidity) and high humidity (72° F. and 88% relative humidity). The results are summarized in the following table:

| | | | | | Tensile (psi) | | | | | | | | |
|---|---|---|---|---|---|---|---|---|---|---|---|---|---|
| | | | | | Hot | | 30 min. | | Overnight - Ambient | | Overnight High Humidity | | |
| Binder | % Catalyst on Binder | Catalyst Makeup | | Molar Equivalent Ratio | 20 Second Dwell | 30 Second Dwell | 20 Second Dwell | 30 Second Dwell | 20 Second Dwell | 30 Second Dwell | 20 Second Dwell | 30 Second Dwell | |
| As Above | 1.5 | Toluene-sulfonic Acid Copper Carbonate | | 1.15:1 | 110 | 115 | 825 | 830 | 805 | 800 | 465 | 485 | |
| As Above | 1.5 | Xylene-sulfonic Acid Copper Carbonate | | 1.06:1 | 79 | 90 | 775 | 790 | 745 | 705 | 310 | 335 | |
| As above | 1.5 | Benzene-sulfonic Acid Copper Carbonate | | 1.15:1 | 115 | 120 | 790 | 775 | 695 | 700 | 340 | 360 | |
| As above | 1.5 | Phenol-sulfonic Acid Copper Carbonate | | 1.14/1 | 105 | 130 | 815 | 810 | 700 | 720 | 270 | 325 | |
| As above | 1.5 | Premade Catalyst of Example I | | | 95 | 110 | 805 | 815 | 820 | 800 | 495 | 530 | |

EXAMPLE VI

In this example dry copper carbonate was added to Wedron 5025 silica sand followed by toluenesulfonic acid and finally the binder of Example I. The molar ratios of copper carbonate and sulfonic acid were varied. The mixes were blown into a hot box machine and patterns heated to 450° F. Dwell times of 20 and 30 seconds were used. A ureido-silane adhesion promoter was employed in the binder in an amount of 0.3% by weight. The tensile strengths of the "dog bone" biscuits were determined while the biscuits were hot and after 30 minutes as well as after storage overnight at ambient temperatures and humidity (74° F. and 70% relative humidity) and high humidity (70° F. and 88% relative humidity). The results are summarized in the following table:

| | | | | | Tensile (psi) | | | | | | | | |
|---|---|---|---|---|---|---|---|---|---|---|---|---|---|
| | | | | | Hot | | 30 min. | | Overnight - Ambient | | Overnight - High Humidity | | |
| Binder | % Catalyst on Binder | Catalyst Reactant I | Catalyst Reactant II | Molar Equivalent Ratio | 20 Sec. Dwell | 30 Sec. Dwell | 20 Sec. Dwell | 30 Sec. Dwell | 20 Sec. Dwell | 30 Sec. Dwell | 20 Sec. Dwell | 30 Sec. Dwell | Bench Life |
| As above | 1.5 | Premade Catalyst of Example I | | | 97 | 110 | 780 | 800 | 750 | 735 | 525 | 555 | >24 hr. |
| As above | 1.5 | Toluene-sulfonic Acid | Copper Carbonate | 1.15/1 | 97 | 130 | 780 | 795 | 765 | 730 | 530 | 555 | >24 hr. |
| As above | 1.5 | Toluene-sulfonic Acid | Copper Carbonate | 1.9:1 | 130 | 140 | 750 | 760 | 685 | 680 | 490 | 540 | ~2 hr. |
| As above | 1.5 | Toluene-sulfonic Acid | Copper Carbonate | 0.95:1 | 100 | 115 | 785 | 795 | 715 | 750 | 545 | 550 | >24 hr. |
| As above | 1.5 | Toluene sulfonic Acid | Copper Carbonate | 1.05:1 | 115 | 125 | 775 | 790 | 730 | 735 | 535 | 550 | >24 hr. |

-continued

| Binder | % Catalyst on Binder | Catalyst Reactant I | Catalyst Reactant II | Molar Equivalent Ratio | Tensile (psi) | | | | | | | | Bench Life |
| | | | | | Hot | | 30 min. | | Overnight - Ambient | | Overnight - High Humidity | | |
| | | | | | 20 Sec. Dwell | 30 Sec. Dwell | 20 Sec. Dwell | 30 Sec. Dwell | 20 Sec. Dwell | 30 Sec. Dwell | 20 Sec. Dwell | 30 Sec. Dwell | |
|---|---|---|---|---|---|---|---|---|---|---|---|---|---|
| As above | 1.5 | Toluene-sulfonic Acid | Copper Carbonate | 1.40:1 | 105 | 130 | 745 | 755 | 665 | 660 | 465 | 475 | ~15 hr. |

Those modifications and equivalents which fall within the spring of the invention are to be considered a part thereof.

What is claimed is:

1. A method of preparing a foundry core which comprises the steps of mixing with a neutral or acidic core sand an aromatic or aliphatic sulfonic acid and a metal compound reactable at substantially ambient temperature with said sulfonic acid to form a latent metal sulfonate catalyst for curable binders and then mixing with the treated core sand a curable binder, forming said treated core sand and binder into a desired shape and heating to cure said binder to produce said sand core.

2. A method according to claim 1 wherein the metal compound reactable with sulfonic acid is a metal carbonate.

3. A method according to claim 1 wherein the metal compound reactable with sulfonic acid is copper carbonate.

4. A method according to claim 1 wherein the curable binder is a furan resin.

* * * * *